C. G. PELTIER.
WATERING FOUNTAIN.
APPLICATION FILED SEPT. 22, 1920.
1,378,053.
Patented May 17, 1921.
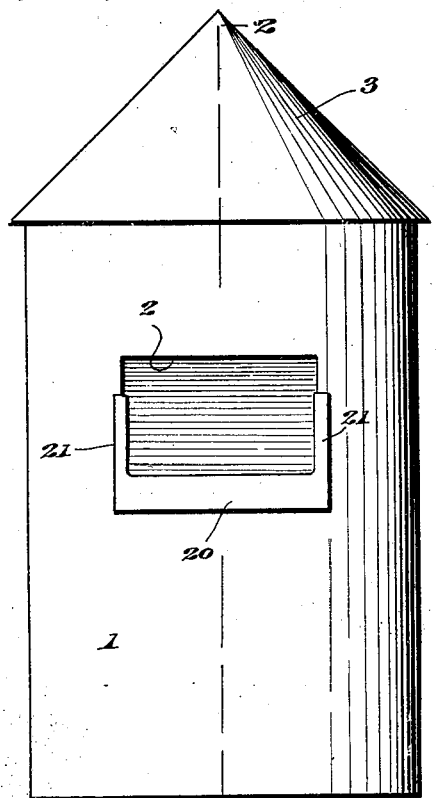
Fig. 1.
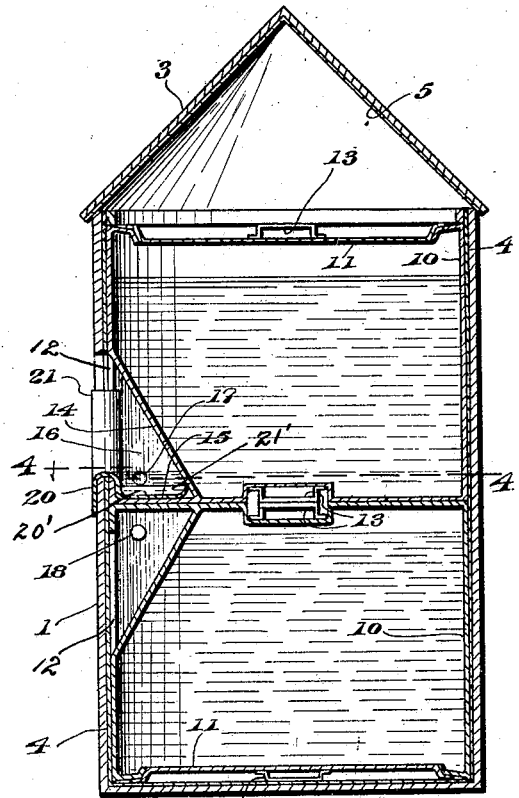
Fig. 2.
Fig. 4.
Fig. 3.
Inventor
Charles G. Peltier.
By
Attorneys

UNITED STATES PATENT OFFICE.

CHARLES GUSTAVE PELTIER, OF ONTONAGON, MICHIGAN.

WATERING-FOUNTAIN.

1,378,053.   Specification of Letters Patent.   Patented May 17, 1921.

Application filed September 22, 1920. Serial No. 412,015.

*To all whom it may concern:*

Be it known that I, CHARLES G. PELTIER, a citizen of the United States, residing at Ontonagon, in the county of Ontonagon, State of Michigan, have invented certain new and useful Improvements in Watering-Fountains; and I do hereby declare the following to be a full, clear, and exact description of the invention, such as will enable others skilled in the art to which it appertains to make and use the same.

This invention relates to animal husbandry, and more especially to watering fountains working on the barometric principle, and the broad object of the invention is to produce a fountain of this kind in which the water is kept from freezing in winter and is kept cool in summer.

Another object is to produce a fountain having duplicate tanks which may be easily filled.

Another object is to construct the tanks so that they may be inverted within the casing to prevent loss of their contents.

Other objects will appear in the following specification which sets forth one successful manner of carrying out the invention.

In the drawing:

Figure 1 is a front elevation of this device ready for use.

Fig. 2 is a vertical section on the line 2—2 of Fig. 1.

Fig. 3 is a perspective detail of the apron removed.

Fig. 4 is a horizontal sectional view taken on the line 4—4 of Fig. 2 just above the bottom of the upper body 10.

The casing or jacket 1 is herein shown as cylindrical, having a substantially rectangular opening 2 in its front, and having a removable cover 3 which may or may not be fastened in place but which is preferably conical so as to prevent fowls from roosting thereon. The entire casing is lined with asbestos or the like as indicated at 4, and the lining may be continued at 5 within the cover. The shape and size of parts are not essential, but it may be well to make the casing cylindrical.

Within the casing are upper and lower tanks. Each has a cylindrical body 10 of a size to fit closely within the lining, and heads 11 preferably inset slightly from the extremities of the body and having handles 13. In the wall of each body is an opening 12 of proper size and disposition to cause the opening in either tank to register with that in the casing when it is supported by the other tank at the bottom of the casing as seen in Fig. 2. The opening forms the mouth of a trough whose top 14 is inclined downward and rearward, whose bottom 15 is formed by the lower head and leads from the lower edge of the top forward to the front wall in a plane below the lower edge of the opening, and whose end walls 16 are upright and are pierced with openings 17 adapted to be closed by plugs or corks 18.

Finally an apron 20 is provided, the same being of metal and of inverted V-shape as seen in Fig. 3, and having upturned channeled ends 21, its purpose being to prevent water from running down between the tanks and the casing. This apron has a pan 20' extending into the opening 12 and has its marginal edges turned upwardly as shown at 21'.

In the use of this device the corks will be removed from one tank which will then be turned on its side or with its axis horizontal, and this tank will befiled with hot or warm water by pouring it into one opening while air flows out the other. The corks are then replaced and the tank inverted and put into the bottom of the casing 1. The second tank may now be filled with tepid or with cold water in the same way, but the corks are not replaced, and this tank is then put into the casing on top of the first tank and the mouth of its trough will register with the opening 3. The apron is now put over the bottom of the two openings, and it extends a little distance up their ends as seen in Fig. 1. Live stock such as chickens may drink at will the water running into the trough through the openings and finding its level therein by the well known barometric principle, and the heat of the water in the lower tank will maintain the water in the upper tank for a long time at a temperature to prevent freezing. When the device is next to be filled, the upper tank is taken out and filled with warm or hot water and inverted and put into the bottom of the casing while the tank which was formerly at the bottom and whose water at this time is tepid, is now put into the top of the casing. In warm weather the condition is the reverse. Each time the fountain is to be filled, that tank which is to go into the bottom is filled with cold water, possibly taken fresh from the well, while the tank already there becomes the upper tank and its water is kept cool by the lower tank. The obvious function of the apron is to prevent the chickens from splashing or spilling water into the space between the tanks and the wall of the casing, although it would not be fatal to the successful operation of the device if this should occur.

As perhaps best seen in Fig. 3, the apron 20 is wide enough to extend into the upper tank a considerable distance over the bottom 15 of the drinking trough, so that this apron will catch food which may drop from the bills of fowls and will catch dust which would otherwise settle in the water. In other words, the apron forms a false bottom for the trough and is curled over the upstanding lower edges of the openings in the casing and upper tank, while its channeled ends 21 embrace the ends of these openings without covering the openings 17.

What is claimed is:

1. In a watering fountain, the combination with an upright casing having an opening in its front; of two duplicate tanks for removable insertion into and close fit within said casing, each having an opening in its front and a trough in rear of said opening, and holes through the walls of the trough into the interior of the tank, the height of one tank being such that it supports the other with the mouth of its trough registering with the opening in the casing.

2. In a watering fountain, the combination with an upright casing having an opening in its front and lined with an insulating material; of two tanks for removable insertion into and close fit within the lining, each having an opening in its front and a trough in rear of said opening, and holes through the walls of the trough into the interior of the tank, the height of one tank being such that it supports the other with the mouth of its trough registering with the opening in the casing, and plugs for closing the holes in the lowermost tank.

3. In a watering fountain, the combination with an upright cylindrical casing having an opening in its wall near its top, a removable cover, and a lining for the casing and cover; of a water tank for close fit in the lower part of said casing, a second water tank for close fit in the upper part of the casing, this tank having an opening adapted to register with that of the casing, and a trough behind said opening.

4. In a watering fountain, the combination with an upright cylindrical casing having an opening in its wall near its top, a removable cover, and a lining for the casing and cover; of a water tank for close fit in the lower part of said casing, a second water tank for close fit in the upper part of the casing, this tank having an opening adapted to register with that of the casing, a trough behind said opening comprising an upper wall inclined inward, a bottom leading from the upper wall forward on a line below the lower edge of said opening, and upright end walls having holes, and means for closing said holes selectively.

5. In a watering fountain, the combination with a casing having an opening in its front; of a tank for removable insertion in said casing and also having an opening in its front near its lower end, a trough behind its opening, the end walls of the trough having holes, plugs for closing said holes selectively, and means for supporting the tank within the casing with their openings in registry, the holes of the tank being above the water level when the tank is inverted and useful for filling when the tank is turned on its side.

6. In a watering fountain, the combination with a casing having a lining of insulating material and an opening in its front near its upper end; of a pair of like water tanks for insertion selectively in the casing one upon the other, each having an opening in one wall and each being of a size to support the other with its opening registering with that in the casing whereby the water in the lower tank tends to maintain the temperature of the water in the other tank while the latter is being consumed.

In testimony whereof, I affix my signature, in the presence of two witnesses.

CHARLES GUSTAVE PELTIER.

Witnesses:
    LOUISE M. PELTIER,
    ELIZABETH PELTIER.